US012180992B2

(12) United States Patent
Simon et al.

(10) Patent No.: US 12,180,992 B2
(45) Date of Patent: Dec. 31, 2024

(54) TELESCOPIC MAST

(71) Applicant: SOUTH MIDLANDS COMMUNICATIONS LTD, Eastleigh (GB)

(72) Inventors: James A P Simon, Eastleigh (GB); John Buttery, Eastleigh (GB); Richard Cole, Eastleigh (GB)

(73) Assignee: SOUTH MIDLANDS COMMUNICATIONS LTD, Eastleigh (GB)

( * ) Notice: Subject to any disclaimer, the term of this patent is extended or adjusted under 35 U.S.C. 154(b) by 650 days.

(21) Appl. No.: 17/425,839

(22) PCT Filed: Jan. 24, 2020

(86) PCT No.: PCT/EP2020/051789
§ 371 (c)(1),
(2) Date: Jul. 26, 2021

(87) PCT Pub. No.: WO2020/152344
PCT Pub. Date: Jul. 30, 2020

(65) Prior Publication Data
US 2022/0112911 A1 Apr. 14, 2022

(30) Foreign Application Priority Data
Jan. 25, 2019 (GB) ...................................... 1901042

(51) Int. Cl.
*F16B 7/10* (2006.01)
*E04H 12/08* (2006.01)
(Continued)

(52) U.S. Cl.
CPC ............. *F16B 7/105* (2013.01); *E04H 12/08* (2013.01); *E04H 12/182* (2013.01); *H01Q 1/103* (2013.01); *Y10T 403/32483* (2015.01)

(58) Field of Classification Search
CPC .................. E04H 12/182; F16B 7/105; Y10T 403/32483; H01Q 1/103
See application file for complete search history.

(56) References Cited

U.S. PATENT DOCUMENTS 4,871,138 A * 10/1989 Sauter ..................... F16B 7/105
52/118
5,593,239 A 1/1997 Sallee
(Continued)

FOREIGN PATENT DOCUMENTS

DE 2454271 A1 * 6/1975 ............. E04H 12/18
EP 0 063 783 A1 11/1982
(Continued)

OTHER PUBLICATIONS

International Preliminary Report on Patentability issued in International Patent Application No. PCT/EP2020/051789 mailed Aug. 5, 2021.
(Continued)

*Primary Examiner* — Michael P Ferguson
(74) *Attorney, Agent, or Firm* — Troutman Pepper Hamilton Sanders LLP

(57) ABSTRACT

A telescopic mast which is automatically extendable and/or retractable comprising a first tubular section and a second tubular section having a locking member mounted thereto. The first tubular section is slideably disposed within the second tubular section, and the locking member is movable in a radial direction relative to the second tubular section to bear against the first tubular section, so that the first and second tubular sections are held together. A third tubular section has a disengaging block mounted thereto. The second tubular section is slideably disposed within the third tubular section, and the disengaging block is shaped to guide the locking member radially outwards and disengage the locking member from the first tubular section when the mast (Continued)

is collapsed. When the mast is retracted or collapsed the second tubular section slides with respect to the third tubular section so the disengaging block guides the locking member radially outwards.

12 Claims, 9 Drawing Sheets

(51) Int. Cl.
*E04H 12/18* (2006.01)
*H01Q 1/10* (2006.01)

(56) References Cited

U.S. PATENT DOCUMENTS

| | | | | |
|---|---|---|---|---|
| 5,624,046 | A * | 4/1997 | Zimmermann | B66C 23/708 |
| | | | | 212/230 |
| 5,661,868 | A * | 9/1997 | Panagakos | B25G 1/04 |
| | | | | 15/144.4 |
| 8,413,390 | B2 * | 4/2013 | Pereira | F16B 7/105 |
| | | | | 343/883 |
| 8,567,005 | B2 * | 10/2013 | Conrad | F16B 7/105 |
| | | | | 15/334 |
| 11,118,372 | B2 * | 9/2021 | Young | F16B 7/105 |

FOREIGN PATENT DOCUMENTS

| | | | | |
|---|---|---|---|---|
| EP | 0063783 | A1 * | 11/1982 | ................ F16B 7/10 |
| FR | 426 353 | A | 7/1911 | |
| FR | 1430168 | A * | 3/1966 | ........... E04H 12/182 |
| JP | S5019028 | | 8/1970 | |
| JP | 50-19028 | B1 | 7/1975 | |
| JP | 2002-308593 | A | 10/2002 | |
| WO | 2009/058241 | A2 | 5/2009 | |
| WO | 2013/067330 | A1 | 5/2013 | |

OTHER PUBLICATIONS

International Search Report issued in corresponding International Patent Application No. PCT/EP2020/051789 dated Jul. 7, 2020.
Written Opinion of the International Searching Authority issued in corresponding International Patent Application No. PCT/EP2020/051789 dated Jul. 7, 2020.
Patents Act 1977: Search Report under Section 17(5) issued in corresponding United Kingdom Patent Application No. GB1901042.0 dated Jul. 2, 2019.
Examination Report mailed Jul. 14, 2022 in Application No. GB1901042.0; 5 pages.
International Search Report for Application No. GB1901042.0 mailed Jul. 2, 2019; 6 pages.

* cited by examiner

TELESCOPIC MAST

CROSS REFERENCE TO RELATED APPLICATIONS

The present application is a U.S. National Phase Application under 35 U.S.C. § 371 of International Patent Application No. PCT/EP2020/051789 filed Jan. 24, 2020, which claims priority of United Kingdom Patent Application No. 1901042.0 filed Jan. 25, 2019. The entire contents of which are hereby incorporated by reference.

FIELD OF THE INVENTION

The invention relates to a telescopic mast upon which apparatus, such as communications or surveillance apparatus, may be mounted. In particular, the telescopic mast is extendable through the use of pressurized fluid, such as a pneumatic telescopic mast. In particular, the telescopic mast is automatically extendable and/or retractable.

BACKGROUND

Telescopic masts are usually temporary structures that are used for mounting or installing apparatus in a location where it is needed. Telescopic masts include a platform or mount at or about their top end which may be used to support a variety of apparatus such as communications or surveillance apparatus.

Telescopic masts generally comprise a plurality of telescopic tubes such that in a retracted or collapsed state the tubes are substantially nested inside one another. In this state, the mast takes on suitable dimensions to allow it to be transported to an operating location where the chosen apparatus is required. Once a suitable location is found, the mast may be erected quickly to a fully extended position to provide a suitable supporting structure for the desired apparatus.

Known telescopic masts may be erected by a variety of mechanisms. For example, each section may be extended by means of a winch, which may be powered by hand or by a motor such as an electric motor. Alternatively, masts may be erected by pneumatics or hydraulics, requiring a supply of pressurized fluid. In particular, pneumatic masts are known in which a supply of compressed gas, for example from a compressor, is connected to the mast and controlled to extend the mast section-by-section.

Some telescopic masts are locking telescopic masts. For example, each section of a telescopic mast is provided with a locking mechanism which locks each respective section with respect to an adjacent inner section. These locking mechanisms help to ensure that the mast is able to maintain the fully extended position, prevent rotational movement between adjacent sections, and also help to control the extension process. When the mast is being erected, an innermost section is extended and, once it reaches its maximum extension, an adjacent outer section is locked to it such that the inner section and the immediately adjacent outer section may both be further extended together. This process is repeated until all of the sections comprising the mast are fully extended, and the mast is erected.

When collapsing the mast, the lock of the outermost, or widest, section is unlocked first, allowing an adjacent inner section to slide with respect to the outermost section in order to be retracted. When the adjacent inner section is retracted, the next adjacent section is unlocked to allow it to slide and retract. The mast is thereby collapsed to a fully retracted or collapsed state by reversing the steps of the erection process.

When erecting or collapsing a mast, therefore, a user or operator is generally required to unlock each section manually to allow it to extend or retract. This requires the user to operate each locking mechanism in turn. The locks are conventionally provided in the form of frictional devices, such as a metal band which can be tightened to clamp to an adjacent inner section, and so lock the band to the adjacent inner section. The frictional devices may, for example, be operated by means of a rotating hand grip or a lever, which must each be operated by a user manually. Alternatively, some known masts use locking devices in the form of locking pins which must be manually actuated by an operator to retract the pins and unlock each mast section. Manually actuating each locking mechanism means that known masts are slow and difficult to erect and retract. Such locking mechanisms may also contain many moving parts and so may be difficult and costly to maintain. The present invention aims to overcome these problems.

SUMMARY

At its most general, the present disclosure provides a telescopic mast in which each locking collar is able to automatically unlock or decouple a tubular section with respect to an adjacent tubular section when the mast is retracted or collapsed and, preferably, is also able to automatically lock or couple a tubular section with respect to an adjacent tubular section when the mast is erected.

According to a first aspect of the invention, there is provided a telescopic mast comprising a first tubular section; a second tubular section having a locking member mounted thereto, wherein the first tubular section is slideably disposed within the second tubular section, and wherein the locking member is movable in a radial direction relative to the second tubular section to bear against the first tubular section, for example so that the first and second tubular sections are held together in a fixed relationship; and a third tubular section having a disengaging block mounted thereto, wherein the second tubular section is slideably disposed within the third tubular section, and wherein the disengaging block is shaped to guide the locking member radially outwards and disengage the locking member from the first tubular section when the mast is collapsed. Preferably, the disengaging block may be shaped such that when the locking member slides or passes over a face of the disengaging block it is moved in a radial direct. For example, the disengaging block may have an angled or sloped surface to achieve this effect, e.g. by being wedge shaped. Of course, any suitable shape or arrangement may be considered. In some embodiments, the third tubular section may be a base section of the mast.

By providing a telescopic mast in this way, when the mast is retracted or collapsed the second tubular section slides with respect to the third tubular section such that the disengaging block guides the locking member radially outwards. This action automatically releases the locking member from bearing against the first tubular section, thereby allowing the first tubular section to slide with respect to the second tubular section and retract. The first aspect of the present invention thereby provides a telescopic mast in which the first and second tubular sections are automatically decoupled from one another when the mast is collapsed, and the locking member does not need to be manually actuated by a user to collapse the mast.

For example, the locking member may be a locking pin and the first tubular section may comprise a pin retaining section such that the disengaging block is shaped to guide the locking pin radially outwards and disengage the locking pin from the pin retaining portion when the locking pin is moved towards the third tubular section by sliding the second tubular section relative to the third tubular section, e.g. when the mast is retracted or collapsed. In some embodiments, the locking pin may comprise a rim or lip about its outer end which is configured to engage with the disengaging block.

Preferably, the locking member is biased in a radially inward direction so as to automatically bear against the first tubular section when the mast is extended. For example, the locking member may be a spring-loaded, or otherwise biased, locking pin, for example to automatically engage a pin retaining portion of the first tubular section when the rod retaining portion is aligned with the locking pin. When the mast is erected, the first tubular section slides with respect to the second tubular section. By biasing the locking member in a radially inward direction, during erection of the mast the second tubular section is automatically locked or coupled to the first tubular section as the locking member bears against the surface of the first tubular section. The second section then slides with respect to the third tubular section in order to fully erect the mast. In this way, the first tubular section and second tubular section are automatically locked or coupled together when the mast is erected, and the locking member does not need to be manually actuated by a user to erect the mast.

Preferably, the first tubular section has an outwardly directed protrusion and the second tubular section has an inwardly directed protrusion, such that the outwardly direction protrusion and the inwardly directed protrusion abut one another when the mast is fully extended. In this way, the inwardly directed protrusion and the outwardly directed protrusion may define a limit of extension of the first tubular section with respect to the second tubular section. This limit of extension ensures that the first tubular section does not become dismounted from within the second tubular section, and may define a region of overlap between the first tubular section and the second tubular section when the mast is fully erected, wherein the length of the region of overlap may be selected in order to ensure strength of the telescopic mast. In particular, this length is chosen to balance the length of the mast when fully erected with its strength. For example, a mast which is very long, and has small regions of overlap between adjacent tubular sections, may not be suitable for supporting large and heavy pieces of apparatus.

Preferably, the second tubular section comprises a collar, wherein the locking member is mounted to the collar. Where a collar is provided on the second tubular section, the collar may comprise a circumferential rim in contact with the outer surface of the first tubular section. This circumferential rim may act as the inwardly directed protrusion discussed above.

Advantageously, the first tubular section may comprise a stop band on the outer surface thereof, wherein the stop band may provide the outwardly direction protrusion as discussed above, such that the stop band may abut the circumferential rim of the collar to define a limit of extension. The stop band may take the form of a metal ring or sleeve which is connected to and surrounds a portion of the first tubular section. For example, the stop band may be welded to the first tubular section, and so may be made of steel or any other suitable metal. In some embodiments, the first tubular section or stop band may comprise an axial slot on an outer surface thereof, and the second tubular section or collar may comprise a key protrusion on in inner surface thereof and disposed within the axial slot. This may help to ensure that the first tubular section does not rotate relative to the second tubular section when extending or retracting to erect or collapse the mast. In some embodiments, a screw or other elongate member may be engaged with this slot when the mast is at full extension, which may add torsional strength to the mast and aid resistance to rotational forces, for example those due to wind acting on the mast and apparatus mounted to the mast. In some embodiments, the limit of extension coincides with a position wherein a locking pin of the second tubular section is aligned with a pin retaining portion of the first tubular section.

Preferably, the collar may also provide sealing to prevent leaking of pressurized fluid and/or to prevent ingress of any contaminants, may provide an anchoring for guy ropes which may be used to steady the mast when erected, may provide anchoring for cable guides which are used to secure cables to equipment mounted at the top of the mast, and also provide other functions. Advantageously, the collar may comprise a second disengaging block. This may allow the first tubular section to additionally comprise a respective locking member for locking or coupling to an additional tubular section which may be slideably disposed within the first tubular section. Of course, any suitable number of locking members and associated disengaging blocks may be considered. As will be appreciated, many such tubular sections may be used to form a telescopic mast of a desired length when fully extended, and each tubular section may comprise a respective locking member, such as a locking pin; and/or a pin retaining portion; and/or a disengaging block; and/or a collar to allow automatic decoupling and/or coupling with adjacent tubular sections when the mast is collapsed and/or when the mast is erected.

Preferably, the second tubular section comprises a bearing member in contact with the outer surface of the second tubular section. Preferably the bearing member may take the form of an annular body which is mounted on an inner surface of the second tubular section. The bearing member may comprise a polymer, such as polytetrafluoroethylene (PTFE), ultra-high-molecular-weight polyethylene, or a similar bearing material for example. The bearing member may be adapted to perform a number of functions. For example, the bearing member may prevent ingress of dirt or liquid to the interior of the mast, and prevent egress of pressurized fluid, for example. The bearing member may also reduce friction between the second tubular section and the first tubular section to aid extension and retraction of the first tubular section. The bearing member may act as a wearing surface. In some embodiments, a collar may also comprise a bearing member having similar respective features and advantages.

As mentioned, the locking member may in some embodiments be provided as a locking pin. Preferably, the first tubular section comprises a pin retaining portion to engage the locking pin when the mast is extended or erected. Preferably the pin retaining portion is a recess in the outer surface of the first tubular section. This recess should not be a through-hole, to ensure that the telescopic mast is sealed to prevent leaking or pressurized fluid which may be used to erect the mast. In some embodiments, the pin retaining portion may comprise a protective ring mounted in the recess.

Advantageously, the disengaging block has a bearing surface which is angled, such that when the locking member slides over the bearing surface when the locking member engages the disengaging block as the locking member is moved towards the third tubular section, the bearing surface guides the locking member radially outwards relative to the first tubular section to disengage the locking member from the first tubular section. By providing a disengaging block in this way, the telescopic mast may be automatically extendable and retractable, making the telescopic mast simple to operate. By automatically disengaging the locking member in this way, the number of complex parts is reduced, making the telescopic mast cheap to manufacture and simple to maintain.

In some embodiments, the third tubular section may comprise a second locking member which is movable in a radial direction relative to the third tubular section to bear against the second tubular section. The third tubular section may thereby be locked or coupled to the second tubular section, in a similar manner as the second tubular section may be locked or coupled to the first tubular section, for example to maintain the second tubular section in an extended position relative to the third tubular section. For example, the second locking member may take substantially the same form as the first locking member and, in some embodiments, the second tubular section may comprise a corresponding second pin retaining portion. However, in other embodiments the second locking member may differ from the locking member of the second tubular section.

Preferably, the third tubular section may comprise a flange portion extending from an outer surface thereof, wherein the flange portion is rotatable about the longitudinal axis of the third tubular section, the flange portion being cooperable with the second locking member such that rotation of the flange portion about the longitudinal axis moves the second locking member in the radial direction relative to the third tubular section. For example, the flange may form part of the third tubular section or may form part of a collar arrangement which is mounted to the third section. The flange portion may be cooperable with the second locking member either directly or indirectly, as described herein. By providing a flange portion in this way, the second locking member may be unlocked by a user operating the flange portion. The flange portion may be particularly advantageous in embodiments of the mast wherein the third section comprises a plurality of second locking members, as each of the locking members may be engaged or disengaged from the second section by a single flange portion, therefore requiring only a single movement to move each locking member by effecting rotation of the flange portion. Optionally, rotating the flange portion in a first direct may move the second locking member radially outward to disengage the second locking member from the second tubular section, and rotating the flange portion in a second direction may move the second locking member radially inward to engage the second tubular section with the second tubular section.

Optionally, the flange portion may be cooperable with the second locking member by way of a mechanical linkage, the mechanical linkage being configured to convert rotation of the flange portion into radial motion of the second locking member. Any suitable mechanical linkage may be chosen by the skilled person. A mechanical linkage provides an efficient and simple way to convert the rotational motion of the flange portion into linear motion suitable for operating the second locking member. This may be particularly advantageous where the third tubular section is provided with a plurality of second locking members which can each be moved by way of the flange portion. Preferably, the mechanical linkage may comprise a cam pathway formed in the flange portion; and a lever arm pivotably connected to the third tubular section and engaged with the second locking member, wherein the cam pathway engages the lever arm such that when the flange portion is rotated the lever arm pivots to move the second locking member in the radial direction.

In some embodiments, the third tubular section has an actuator mounted thereto, the actuator being configured to move the second locking member in a radial direction to the third tubular section. For example, the actuator may be an electrically controlled actuator such as a solenoid. This may allow the third tubular section to be decoupled from the second tubular section remotely by a user, for example to collapse the mast. Alternatively, the actuator is a mechanically controlled actuator, which may be manually operated by a user (for example, the mechanically controlled actuator may comprise ropes or wires which may be pulled by a user, for example in the form of a pulley system). In some examples, the actuator may be configured to rotate the flange portion in order to move the second locking member via the flange portion. For example, an actuator may be configured to pull wires or ropes connected to the flange portion in order to move the flange portion and thereby move the second locking member, or an actuator may directly rotate the flange portion. Such an arrangement is particularly advantageous when a plurality of second locking members is provided, which may each be moved by the flange portion.

In some embodiments, the second locking member may comprise a locking pin having a helical thread on its outer surface and the locking pin may fit within an internally threaded bore, such that rotating the second locking member causes linear movement in the radial direction relative to the third tubular section. This may allow the second locking member to be retained in either a locked or an unlocked position. Alternatively, the second locking member may comprise a locking pin having a bayonet mechanism, or bayonet mount, which allows the locking pin to be twisted and fixed in an unlocked position. Preferably, the bayonet mechanism may comprise a spring to urge the locking pin to a locked position when the locking pin is not fixed. In this way, the second locking mechanism may be held in an unlocking positioned to enable the mast to be raised and lowered. Of course, other mechanisms may be considered to achieve similar aims. In some examples the thread may be provided in addition to the flange portion such that the second locking member may be moved radially by either mechanism. In particular, the thread may allow the second locking member to be retained in an open or unlocked position which is disengaged from the second tubular section to allow the mast to be extended or retracted without use of the flange portion. The second locking member may have a lever operable to rotate the second locking member in some examples. Preferably, the third tubular section comprises a flange portion outwardly extending from an outer surface thereof, wherein the flange portion is rotatable about the longitudinal axis of the third tubular section to operate the lever and so rotate the second locking member.

These embodiments allow a user to selectively operate the second locking member. For example, when a telescopic mast is fully extended and a user wishes to retract or collapse the mast, the user operates the second locking member to decouple or unlock the second tubular section from the third tubular section. This allows the second tubular section to slide and retract. Sliding and retracting the second tubular section causes the first locking member, that is the locking member of the second tubular section, to be automatically disengaged from the first tubular section by action of the disengaging block. Disengaging the locking member from the first tubular section in this way allows the first tubular section to slide relative to the second tubular section and retract. In this way, the mast may be collapsed by the user operating only a single locking member (the second locking member) or, in some embodiments, by the user operating the flange portion which may move a plurality of locking members in some examples. This is in contrast with prior art arrangements, in which a user is required to operate each locking member of each section in turn.

Preferably, the third tubular section is mounted to a base section. For example, in some embodiments the third tubular section may be a locking collar as described herein, or the third tubular section may comprise a locking collar having the disengaging block, flange and other associated features as discussed above affixed thereto. Advantageously, the base section may comprise a connector for connecting the telescopic mast to a pressurized fluid supply. This may allow the telescopic mast to be erected using pneumatics. In some embodiments, the base section may comprise a valve for selectively releasing pressurized fluid from within the telescopic mast. By controlling the rate of discharge from the valve, a user may control the rate of retraction or collapse of the telescopic mast.

According to a second aspect of the present invention, there is provided a locking collar for mounting to a tubular section of a telescopic mast, the locking collar comprising a locking member mounted to the collar, the locking member being movable in a radial direction relative to the locking collar; and a disengaging block shaped to guide a locking member of a second locking collar radially outwards relative to the second locking collar when the locking member of the second locking collar engages with the disengaging block and moves towards the locking collar. Preferably, the disengaging block may be shaped such that when the locking member slides or passes over a face of the disengaging block it is moved in a radial direct. For example, the disengaging block may have an angled or sloped surface to achieve this effect, e.g. by being wedge shaped. Of course, any suitable shape or arrangement may be considered.

By providing a locking collar in this way, a telescopic mast utilizing the locking collar may be automatically retractable or collapsible as described herein. This is because the disengaging block of a first locking collar is shaped to guide a locking member of a second locking collar radially outwards, and so release the locking member of the second locking collar from a position in which it bears against an adjacent inner tubular section.

Preferably, the locking member is biased in a radially inward direction relative to the locking collar. In this way, the locking member may automatically bear against the surface of an adjacent inner tubular section when the telescopic mast is extended or erected, and a user does not need to manually operate the locking member.

In some embodiments the locking collar may comprise an inwardly directed protrusion. The inwardly directed protrusion may engage with an outwardly directed protrusion of an adjacent inner tubular section in use, to define a limit of extension of the tubular section relative to the locking collar. For example, the inwardly directed protrusion may be a circumferential rim.

Preferably, the locking collar comprises a bearing member on an inner surface. The bearing member may provide a bearing along which an adjacent inner tubular section slides, for example. Preferably the bearing member may take the form of an annular body which is mounted on an inner surface of the locking collar. The bearing member may comprise a polymer, such as polytetrafluoroethylene (PTFE), ultra-high-molecular-weight polyethylene, or a similar bearing material for example. The bearing member may be adapted to perform a number of functions. For example, the bearing member may prevent ingress of dirt or liquid to the interior of a telescopic mast, and prevent egress of pressurized fluid, for example. The bearing member may also reduce friction between the locking collar and an adjacent inner tubular member to aid extension and retract of the tubular member. The bearing member may act as a wearing surface.

Advantageously, the disengaging block may have a bearing surface which is angled, such that when the locking member of the second locking collar slides over the bearing surface as the second locking collar is moved towards the locking collar, the bearing surface guides the locking member of the second locking collar radially outwards relative to the second locking collar. By providing a disengaging block in this way, a telescopic mast utilizing the locking collar may be automatically extendable and retractable, making the telescopic mast simple to operate. By automatically disengaging the locking member in this way, the number of complex parts is reduced, making the locking collar cheap to manufacture and simple to maintain.

In some embodiments, the disengaging block may comprise a retaining mechanism configurable to prevent the locking member of a second locking collar moving relative to the disengaging block. For example, the disengaging block may comprise a retaining pin which can be inserted into the disengaging block so as to prevent a locking member from moving relative to the disengaging block. This may be used to ensure that a second locking collar cannot move relative to the first locking collar, for example to ensure that sections of a telescopic mast cannot be extended.

Preferably, the locking collar may comprise a key protrusion on its inner surface. This key protrusion may be particularly advantageous where an adjacent inner tubular section has an axial groove or slot on an outer surface thereof, for example an axial groove or slot in a stop band, to ensure that the inner tubular section does not rotate relative to the locking collar.

In some embodiments, the locking member is a locking pin. The locking pin may be particularly suited to engage with a pin retaining portion of an adjacent inner tubular section and so lock the inner tubular section in place with respect to the locking collar. Preferably the locking pin is spring-loaded in order to bias it in a radially inward direction relative to the locking collar.

Preferably, the locking collar may comprise a flange portion extending from an outer surface thereof, wherein the flange portion is rotatable about the longitudinal axis of the locking collar, the flange portion being cooperable with the locking member such that rotation of the flange portion about the longitudinal axis moves the locking member in the radial direction relative to the locking collar. The flange portion may be cooperable with the locking member either directly or indirectly, as described herein. By providing a flange portion in this way, the locking member may be unlocked by a user operating the flange portion. The flange portion may be particularly advantageous in embodiments wherein the locking collar comprises a plurality of locking members, as each of the locking members may be moved radially by a single flange portion, therefore requiring only a single movement to move each locking member by effecting rotation of the flange portion. Optionally, rotating the flange portion in a first direct may move the second locking member radially outward, and rotating the flange portion in a second direction may move the second locking member radially inward.

Optionally, the flange portion may be cooperable with the locking member by way of a mechanical linkage, the mechanical linkage being configured to convert rotation of the flange portion into radial motion of the locking member. Any suitable mechanical linkage may be chosen by the skilled person. A mechanical linkage provides an efficient and simple way to convert the rotational motion of the flange portion into linear motion suitable for operating the locking member. This may be particularly advantageous where the locking collar is provided with a plurality of locking members which can each be moved by way of the flange portion. Preferably, the mechanical linkage may comprise a cam pathway formed in the flange portion; and a lever arm pivotably connected to the locking collar and engaged with the locking member, wherein the cam pathway engages the lever arm such that when the flange portion is rotated the lever arm pivots to move the locking member in the radial direction.

In some embodiments, the locking collar has an actuator mounted thereto, the actuator being configured to move the locking member in a radial direction to the locking collar. For example, the actuator may be an electrically controlled actuator such as a solenoid, which may be controlled remotely. Alternatively, the actuator is a mechanically controlled actuator, which may be manually operated by a user. In some examples, the actuator may be configured to rotate the flange portion in order to move the locking member via the flange portion. Such an arrangement is particularly advantageous when a plurality of locking members is provided, which may each be moved by the flange portion.

In some embodiments, the locking member may comprise a locking pin having a helical thread on its outer surface and the locking pin may fit within an internally threaded bore, such that rotating the second locking member causes linear movement in the radial direction relative to the locking collar. In some examples the thread may be provided in addition to the flange portion such that the locking member may be moved radially by either mechanism. In particular, the thread may allow the locking member to be retained in an open or unlocked position to allow a mast to be extended or retracted without requiring use of the flange portion. The locking member may have a lever operable to rotate the locking member in some examples. Preferably, the locking collar comprises a flange portion outwardly extending from an outer surface thereof, wherein the flange portion is rotatable about the longitudinal axis of the locking collar to operate the lever and so rotate the locking member.

Preferably, the locking collar may comprise an anchor for a guy rope. In this way, a telescopic mast utilizing the locking collar may be additional secured in place using guy ropes. Additionally and/or alternatively, the locking collar may comprise a cable guide, which may be used for retaining cables leading to equipment which is mounted on the mast.

In a third aspect of the invention, there is provided a telescopic mast comprising a locking collar according to the second aspect of the invention.

In a fourth aspect of the present invention, there is provided a telescopic mast system comprising a telescopic mast according to either the first aspect or the third aspect of the present invention, a pressurized fluid supply unit, and a pipeline connecting the pressurized fluid supply to the telescopic mast, wherein the pressurized fluid supply unit is used to supply pressurized fluid for erecting and collapsing the telescopic mast. Preferably the telescopic mast system further comprises a support stand for receiving the telescopic mast. For example, the support stand may be suitable for receiving ballast or a load to help support the telescopic mast. Preferably, the support stand is configured to prevent rotation of the telescopic mast. For example, the support stand may comprise keying features which engage with corresponding key features on the telescopic mast. In some embodiments, the pressurized fluid supply unit may be a gas compressor.

References herein to 'tubular sections' should be understood as referring to sections of a telescopic mast having any cross-sectional shape. For example, cylindrical sections may be preferred, but the teaching of the present invention is also applicable to sections having square or triangular cross-sections, for example. References herein to a radial direction should therefore be interpreted as being away or toward a centre of the cross-sectional shape, or the longitudinal axis of the section. Each tubular section may be made of any suitable material, preferably a metal material such as aluminium or steel, for example.

As described herein, tubular sections of a telescopic mast, or locking collars in some embodiments, may comprise any suitable number of locking members and disengaging blocks. For example, a mast may comprise tubular sections or locking collars having a single locking member and/or disengaging block, or a plurality of locking members and/or disengaging locks. For example, tubular sections or locking collars may be provided having two, or three, or more locking members and/or disengaging blocks.

BRIEF DESCRIPTION OF THE DRAWINGS

Embodiments of the present invention will now be discussed, by way of example only, with reference to the accompanying Figures.

DETAILED DESCRIPTION

Figure 1:
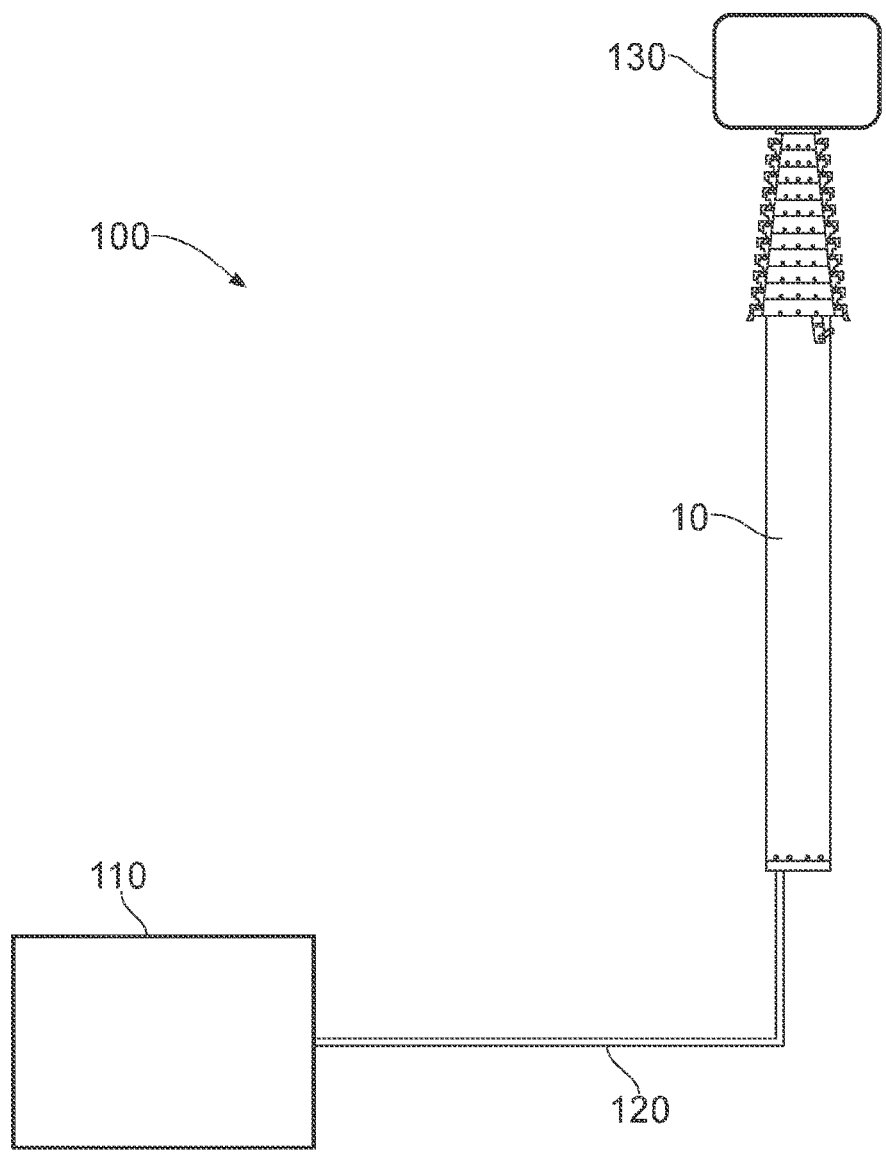
FIG. 1 is a schematic diagram of a telescopic mast system according to an embodiment of the present invention.

FIG. 1 is a schematic diagram of a mast system 100 according to an embodiment of the present invention. The mast system 100 comprises a telescopic mast 10, pressurized fluid supply unit 110 and pipeline 120. The mast system 100 is preferably portable in a collapsed state, e.g. transportable by a vehicle such as a truck or a car, such that the mast system 100 may be set up and used wherever it is required. The mast system 100 may also comprise a support stand, not shown, into which the telescopic mast 10 may be mounted. The support stand and telescopic mast 10 may have corresponding key portions to prevent rotation of the telescopic mast 10 with respect to the support stand. The support stand may also be configured to be weighted down, for example with ballast, to help anchor the telescopic mast in position.

The telescopic mast 10 is a mast substantially as described herein, for example with respect to FIGS. 2-9, and is depicted in FIG. 1 in a retracted or collapsed position. However, the telescopic mast 10 is extendable to a fully extended position, for example by using a supply of compressed gas from the pressurized fluid supply unit 110, which is delivered to the mast 10 through a pipeline 120. In preferred embodiments the pressurized fluid supply unit 110 may be a gas compressor. The mast 10 may be locked in a fully extended position such that the pressurized fluid supply unit 110 does not need to be connected to the mast 10 in order to maintain the fully extended position. This allows the pressurized fluid supply unit 110 and pipeline 120 to be disconnected from the mast 10, for example to be used to erect other masts. Preferably the pressurized fluid supply unit 110 is also connected to the mast 10 via the pipeline 120 when the mast 10 is retracted from the extended position. The pressurized fluid supply unit 110, or a valve on the mast 10 itself, may then be controlled to carefully vent compressed gas from within the mast 10 in order to control the rate of retraction of the mast 10.

The top of the mast 10 may comprise a mount or fixing which is adapted to be connected to a piece of apparatus 130. Apparatus 130 may be any piece of apparatus which a user desires to be permanently or temporarily mounted in a high location. For example, apparatus 130 may comprise lighting, surveillance apparatus, and/or communications apparatus such as for facilitating telecommunications. However, it is envisaged that the mast system 100 will be supplied without apparatus 130 such that a user can choose to mount any apparatus to the mast 10 depending on their specific use case. By mounting apparatus 130 to a telescopic mast 10, the apparatus 130 may be raised for optimal coverage of an area by the apparatus 130. Retracting mast 10 from the fully extended position allows the apparatus 130 to be lowered for servicing and/or when the apparatus 130 is no longer required for use.

Figure 2:
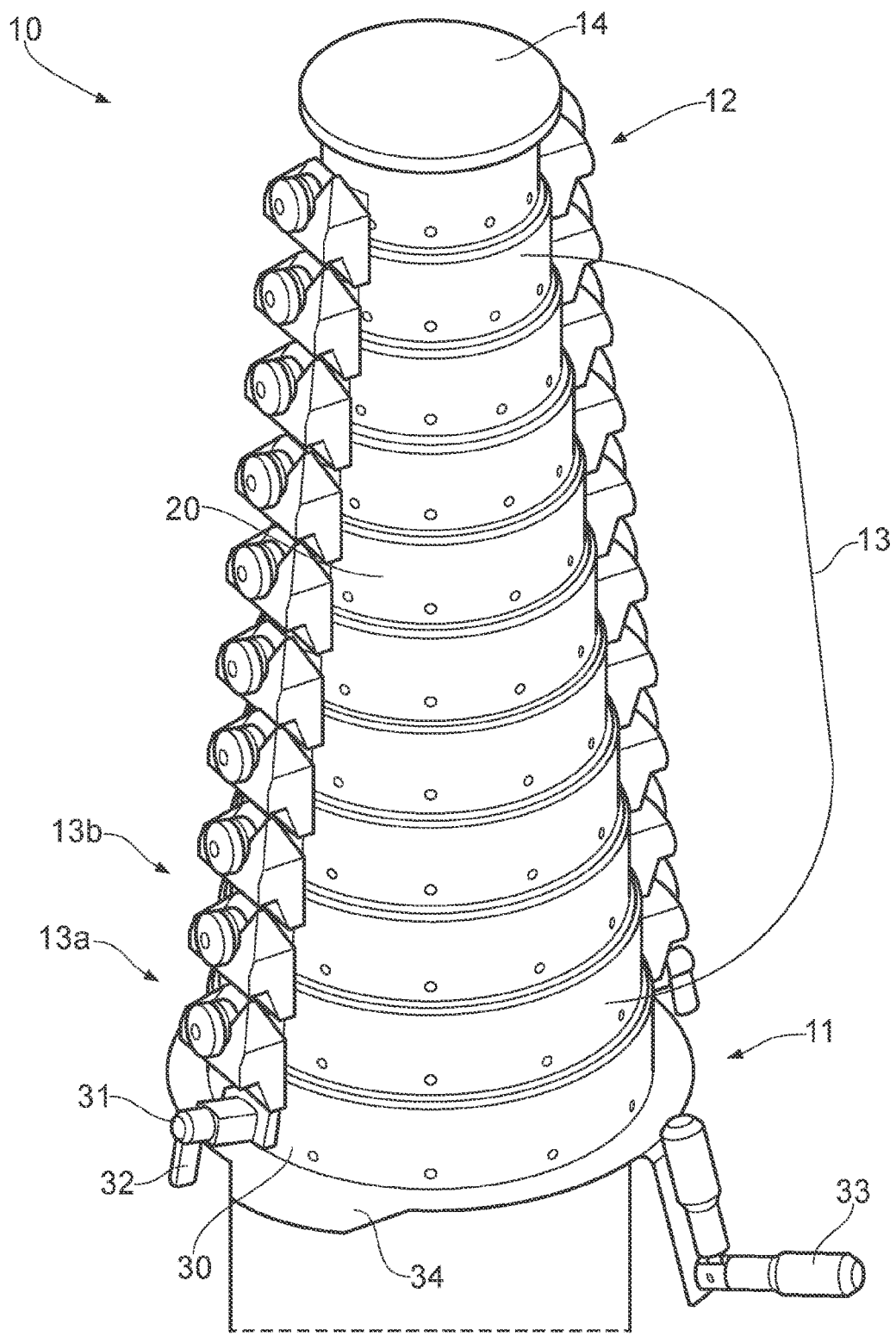
FIG. 2 is a schematic view of a telescopic mast according to an embodiment of the present invention in a collapsed state.
Figure 3:
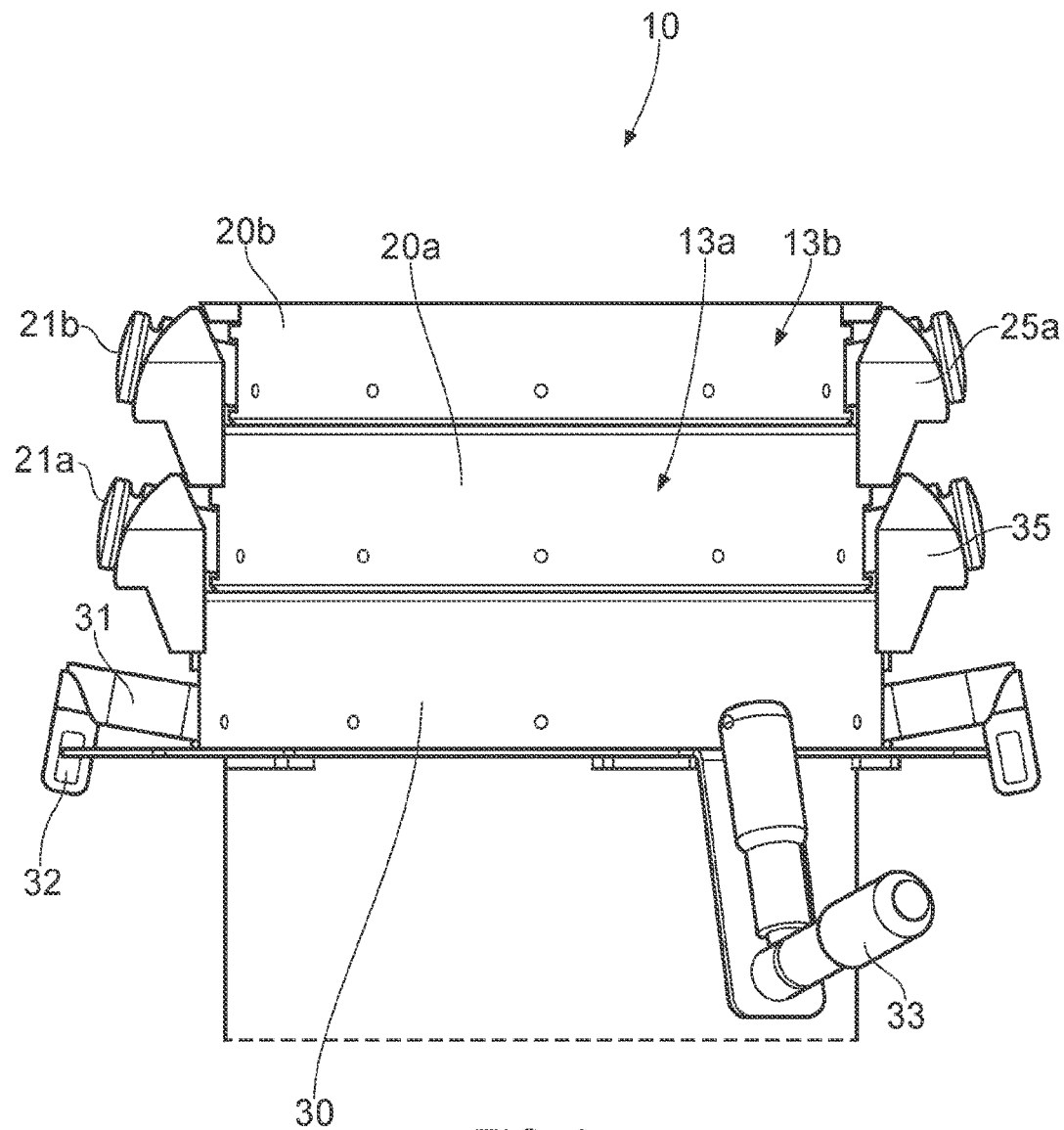
FIG. 3 is a side view of a telescopic mast according to an embodiment of the present invention in a collapsed state.

FIG. 2 shows a schematic view of the telescopic mast 10 in a retracted position. FIG. 3 shows a side view of the telescopic mast 10, in particular a close view of a base section 11 and two intermediate sections 13a, 13b comprising the mast 10.

The mast 10 comprises a plurality of telescoping tubular sections which fit inside one another. The tubular sections may be considered equivalent to a series of pistons, which are acted upon by a pressurized fluid in order to extend the mast 10. In particular, the mast comprises a base section 11, a top section 12, and a number of intermediate sections 13. In the depicted embodiment there are nine intermediate sections 13, but any suitable number may be used in order for the mast 10 to reach a preferred length when fully extended. For example, when fully erected the mast 10 may reach a height of at least 20 metres, such as 30 metres or more. The base section 11 has the largest diameter, and the top section 12 has the smallest diameter. For example, the base section 12 may have an outer diameter of more than 200 mm, such as approximately 230 mm or approximately 300 mm. However, it is also possible that the base section 12 may have an outer diameter of less than 200 mm. The tubular sections forming the telescopic mast 10 are nested. That is, the top section 12 is slideably disposed within a first adjacent intermediate section, wherein the first adjacent intermediate section has a slightly larger diameter than the top section 12. The first intermediate section is slideably disposed within an adjacent second intermediate section, wherein the second intermediate section has a slightly larger diameter than the first intermediate section. This is repeated until a final intermediate section, which is slidably disposed within the base section 11. Each section shown is a tubular section having a circular cross-section. However, the teaching of the present invention is also applicable to tubular sections having any cross-sectional shape. Preferably, each of the tubular sections is made of a metal material, such as aluminium or steel.

The top section 12, in this embodiment, comprises a platform 14 onto which apparatus may be mounted by a user. For example, the apparatus may be apparatus 130 as shown in FIG. 1. In some embodiments, the platform 14 may have a number of through-holes to which apparatus may be bolted. However, apparatus may be mounted to be mast in any appropriate manner, and the platform 14 may be suitably adapted therefor.

Each of the intermediate sections 13 comprises a locking collar 20 which is configured to automatically lock or couple a respective intermediate section 13 with an adjacent inner section when the mast 10 is erected, and automatically unlock or decouple the adjacent inner section from a next inner section when the mast 10 is collapsed or retracted from the extended position. This manner of operation will be explained in more detail below.

The base section 11 comprises a collar 30, which is configured to lock the base section 11 to the final intermediate section 13a when the mast is fully extended, and unlock the base section 11 from the final intermediate section 13a when the mast is retracted or collapsed. The collar 30 of the base section 11 comprises locking pins 31 which may be manually actuated by a user, though in some embodiments it is envisaged that the locking portions may be actuated electronically such that a user can retract or extend the mast remotely. For example, in the depicted embodiment, the locking pins 31 of the collar 30 each comprise a lever 32 which is operable to rotate a respective locking pin. Each locking pin 31 is threaded such that rotation is translated into linear movement along a radial direction with respect to the base section 11. Alternatively, the locking pin 31 may have a bayonet mechanism, or bayonet mount, which allows the locking pin 31 to be twisted and fixed in an unlocked position. Preferably, the bayonet mechanism may comprise a spring to urge the locking pin 31 to a locked position when the locking pin is not fixed. In this way, the locking pin 31 may be held in an unlocking positioned to enable the mast to be raised and lowered. The levers 32 are preferably operable by way of handle 33 connected to a flange 34 which is rotatable about the longitudinal axis of the base section 11 and collar 30. The flange 34 has laterally extending section which engages a lever 32 when the flange 34 is rotated by a user operating the handle 33, and in doing so causes the locking pins 31 to couple or decouple from the final intermediate section 13a. In some examples, the flange 34 may be rotated remotely, for example by a remotely controlled actuator such that a user is able to remotely lock or unlock the locking pins 31 of the collar 30.

An alternative arrangement of the base section 11 and collar 30 is discussed below with respect to FIGS. 6 and 7.

It is a particular feature of the present invention that a user need only unlock or decouple the base section 11 from the final intermediate section 13a when the mast 10 is in the fully erected state in order to collapse the mast 10 completely. This is advantageous because the operator does not need to operate locking members of each intermediate section 13 in turn, which is required in prior art arrangements.

As can be seen in FIG. 3, the collar 30 comprises two disengaging blocks 35. The collar 20a of the final intermediate section 13a comprises two locking members 21a and two disengaging blocks 25a. The collar 20b of the penultimate intermediate section 13b also comprises two locking members 21b and two disengaging blocks (not shown). However, each locking collar 20 may comprise any suitable number of locking members 21 and disengaging blocks 25. For example, a mast 10 may comprise locking collars 20 each having a single locking member 21 and disengaging block 25, or three locking members 21 and disengaging blocks 25. As will be appreciated, in the collapsed configuration of the mast 10, the locking members 21a of the final intermediate section 13a are engaged completely with respective disengaging blocks 35 of the collar 30 of the base section 11. In this position, the locking members 21a therefore do not bear against the penultimate intermediate section 13b, which is the adjacent inner section of the final intermediate section 13a. Similarly, the locking members 21b of the penultimate intermediate section 13b are engaged completely with respective disengaging blocks 25a of the final intermediate section 13a, and so do not bear against a next inner section.

In this embodiment, the locking members 21a, 21b are spring-loaded, and so are biased in a radially inward direction relative to the tubular sections. When the mast 10 is erected, the penultimate intermediate section 13b slides upwards relative to the final intermediate section 13a. This motion causes the locking members 21b to slide over a bearing surface of the disengaging blocks 25a, and they automatically move in an inner radial direction. By moving in a radially inward direction, the locking members 21b then bear onto a next inner tubular section, locking the penultimate intermediate section 21b to the next inner tubular section. Similarly, when the penultimate intermediate section 13b reaches its full extension, it causes the final intermediate section 13a to slide upwards relative to the base section 11. This motion causes the locking members 21a to slide over a bearing surface of the disengaging blocks 35, and they automatically move in a radially inward direction. Moving in a radially inward direction causes the locking members 21a to bear against the penultimate intermediate section 13b, and lock or couple the final intermediate section 13a to the penultimate intermediate section 13b. When the final intermediate section 13a reaches its full extension, handle 33 is operated by a user to engage the locking pins 31 with the surface of the final intermediate section 13a and so lock the mast 10 in its fully extended position. When erecting the mast 10, therefore, a user is only required to operate the locking pins 31 of the base section 11, and this may be done either locally or remotely (e.g. by remotely controlling an actuator), for example by a user operating a flange portion as discussed herein.

When the mast 10 is retracted or collapsed from the fully extended position, these motions proceed in reverse order. In order to start the retraction or collapsing process, a user operates the handle 33, or remotely controls an actuator, to rotate locking pins 31 and so disengage them from the final intermediate section 13a. This allows the final intermediate section 13a to slide downwards relative to the base section 13. When the final intermediate section 13a slides down and towards the base section 11, the locking members 21a slide over the bearing surface of the disengaging blocks 35 such that the locking members 21a are disengaged from the penultimate intermediate section 13b. The disengaging blocks 35 are shaped to guide the locking members 21a radially outwards to automatically disengage the locking members 21a in this way when the mast 10 is collapsed. When the locking members 21a are disengaged from the penultimate intermediate section 13b, the penultimate intermediate section 13b is able to slide relative to the final intermediate section 13a. The penultimate intermediate section 13b slides down and towards the final intermediate section 13a such that the locking members 21b slide over the bearing surface of the disengaging blocks 25a such that the locking members 21b are disengaged from a next inner intermediate section. This process continues section by section until the mast 10 is fully collapsed to the configuration depicted in FIGS. 2 and 3. The disengaging blocks thus automatically disengage locking members of a next inner tubular section, allowing the next inner tubular section to retract and collapse the mast 10. As a result of this automatic disengaging, a user is only required to operate the locking pins 31 of the base section 11 to fully collapse the mast 10, in contrast with the prior art. It should be noted that the mast 10 is preferably pressurized during the collapsing process to control the rate of retraction of each section, and so a gas compressor may be connected to the mast 10 during this process. For example, a user may operate a valve, or a valve may automatically control the discharge rate of pressurized fluid from within the mast 10.

Figure 4:
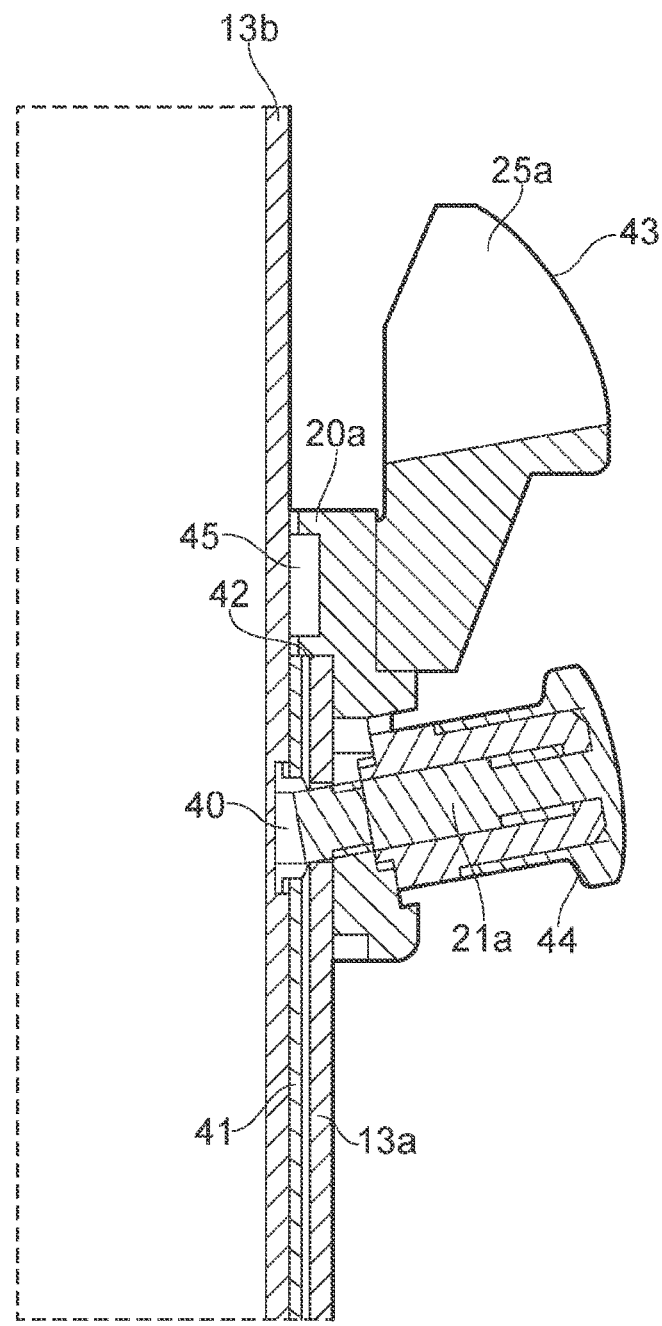
FIG. 4 is a cross-sectional view of a telescopic mast according to an embodiment of the present invention.
Figure 5:
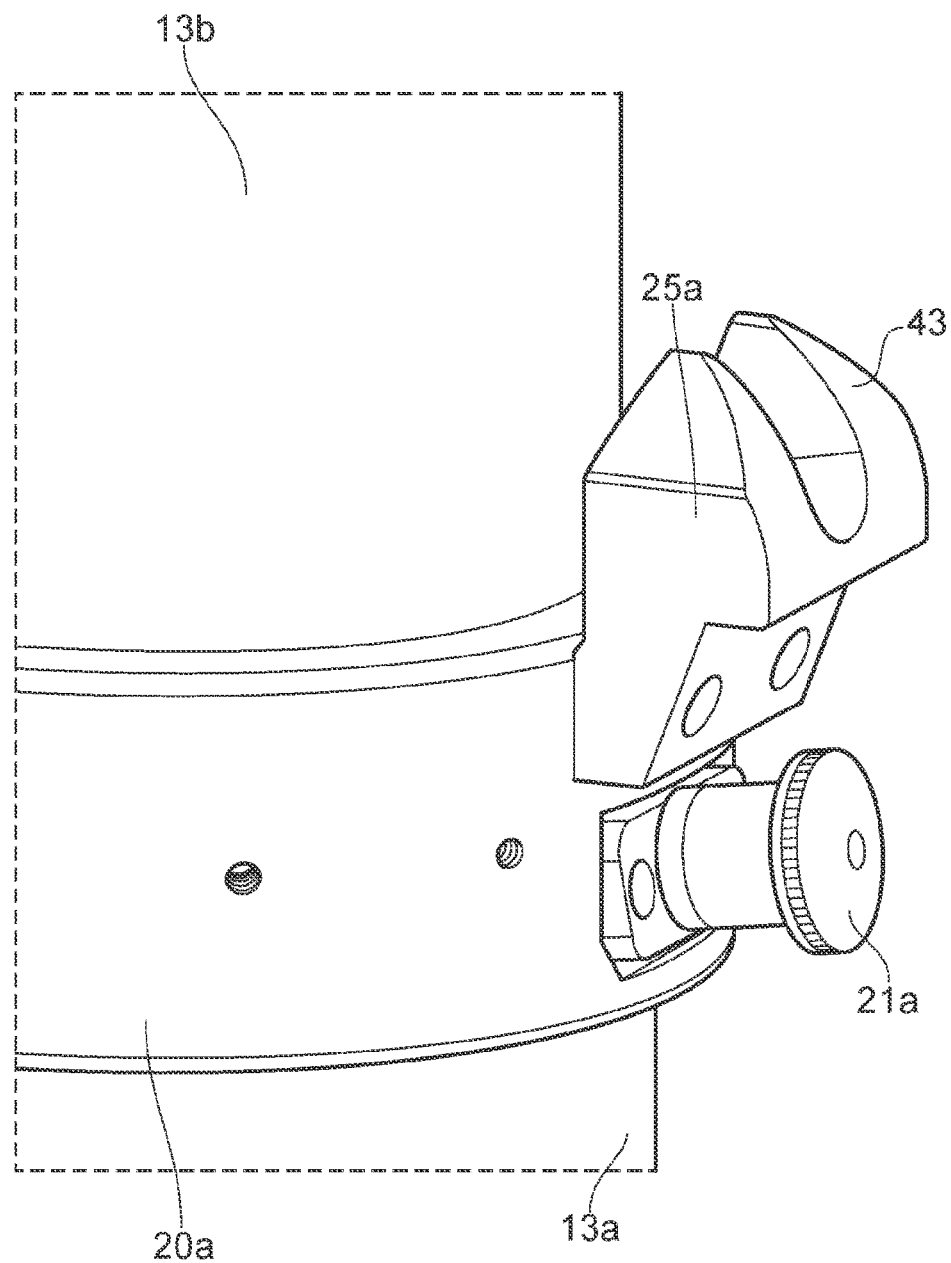
FIG. 5 is a schematic view of a telescopic mast according to an embodiment of the present invention.

FIG. 4 shows a cross-sectional view of a telescopic mast 10. In particular, FIG. 4 shows a cross section through final intermediate section 13a, penultimate intermediate section 13b and locking collar 20a. FIG. 5 shows a schematic view of the penultimate intermediate section 13b, final intermediate section 13a and locking collar 20a. Mounted to the locking collar 20a is a locking member 21a and a disengaging block 25a. The mast 10 is depicted in an extended position, wherein the locking member 21a is a locking pin engaged with a pin retaining portion 40 which is recessed into the outer surface of the penultimate intermediate section 13b to couple the final intermediate section 13a with the penultimate intermediate section 13b. In particular, the locking member 21a is biased in a radially inward direction, e.g. by a spring, to ensure that the locking member 21a automatically engages the pin retaining portion 40 when the mast 10 is fully extended and the locking member 21a is aligned with the pin retaining portion 40.

As can be seen in FIG. 4, the penultimate intermediate section 13b is provided with a protrusion in the form of a stop band 41. This stop band 41 is a metal cylinder which may be welded or otherwise attached to the outside of the penultimate intermediate section 13b. The stop band 41 is provided to abut a circumferential rim 42 of the locking collar 20a in order to define a limit of extension of the penultimate intermediate section 13b with respect to the final intermediate section 13a. As will be appreciated, there is a region of overlap between the penultimate intermediate section 13b and the final intermediate section 13a, wherein the length of this overlapping region is defined by the position of the stop band 41. By overlapping regions of the two sections in this way the mast 10 may be strengthened. The length of the overlapping region may be chosen to provide suitable strength to the mast 10 while still ensuring the mast 10 can reach the desired length.

The disengaging block 25a comprises a bearing surface 43 along which a locking member 21b of the penultimate intermediate section 13b is configured to slide in order to be disengaged from a next inner section. In particular, the bearing surface 43 is angled, and may be shaped to engage with a lip 44 of a locking member in order to guide the locking member radially outwards relative to the penultimate intermediate section 13b. As can be seen in FIG. 5, the disengaging block 25a is a generally U-shaped member, wherein a locking member of an adjacent section (in particular, the penultimate intermediate section 13b) may be received between the arms of the U-shape when the mast is collapsed. The bearing surface 43 is formed on the outside surface of the arms of the U-shape in order to engage the lip 44 of a locking member to guide the locking member radially outwards relative to the penultimate intermediate section 13b when the mast is collapsed. For example, each arm of the U-shape may be angled, or provided generally in the form of a wedge which the lip 44 of a locking member may pass over to be disengaged from the surface of a next inner section.

In some embodiments, the disengaging block may comprise a retaining mechanism configurable to prevent the locking member of a second locking collar moving relative to the disengaging block. For example, a retaining pin may be provided to couple with the disengaging block 25a in order to hold a locking member in place when the mast is in a collapsed configuration. For example, a retaining pin may be configured to span the gap between the arms of the U-shaped disengaging block 25a (e.g. by passing through an aperture in one or each arm of the disengaging block) so as to prevent the locking member becoming free from the disengaging block 25a and thereby prevent the adjacent section extending. By providing a retaining pin in this way, a user may select which sections of the mast they wish to extend by selectively utilizing one or more retaining pins, and this allows all mast sections to be locked together by coupling a retaining pin with each disengaging block to prevent accidental extension of the mast, for example when the mast is transported.

As shown in FIG. 4, the locking collar 20a also comprises a bearing member 45. The bearing member 45 is an annular component which is in contact with the outer surface of the penultimate intermediate section 13b. The bearing member 45 may comprise polytetrafluoroethylene (PTFE), ultra-high-molecular-weight polyethylene, or a similar bearing material for example, to provide a wearing surface to enable the penultimate intermediate section to slide smoothly with respect to the final intermediate section 13a and locking collar 20a.

It will be appreciated by those skilled in the art that each section of a telescopic mast may be provided with a locking collar 20 substantially the same as locking collar 20a as shown in FIGS. 4 and 5.

Figure 6:
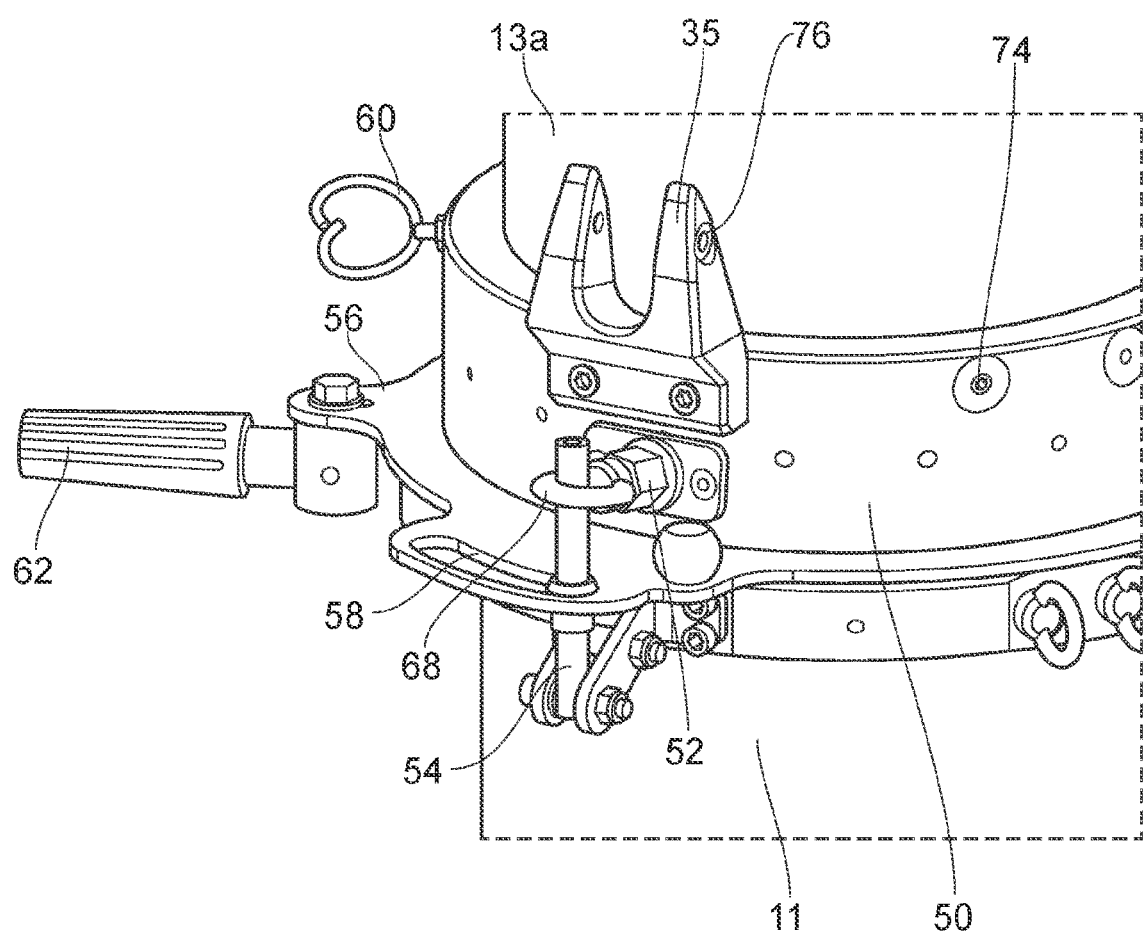
FIG. 6 is a perspective view showing a base section unlocking assembly in an embodiment of the present invention.

FIG. 6 shows a perspective view of a base section unlocking assembly which may be provided as an alternative to that discussed above with respect to FIG. 2. The base section unlocking assembly allows the final intermediate section 13a to be locked or unlocked by a user to extend and collapse the mast, where other sections of the mast are locked and unlocked automatically by the locking collar arrangements which are discussed above.

Similarly to the arrangement shown in FIG. 2, the base section 11 comprises a collar 50 which is configured to lock or unlock the base section 11 from the final intermediate section 13a. For example, the base section 11 and the final intermediate section 13a may be unlocked to allow the mast to be extended or collapsed, and may be locked to hold the sections in a relative position (e.g. when the mast is fully extended). The collar 50 also comprises a disengaging block 35 configured to cooperate with a locking member of the final intermediate section 13a, particularly to disengage a locking member of the final intermediate section 13a from a penultimate intermediate section substantially as described above when the mast is collapsed. A cable guide 60 is also provided on the collar 50 which may be used to secure any cables or wiring which lead to equipment which is mounted on top of the mast. The collar 50 also provides a fitting 74 which may be used as an attachment point for a guy rope (e.g. via an eyelet) which may be used to secure and stabilize the mast when it is extended and in use.

The collar 50 of the base section comprises a locking pin 52 which is linearly movable in a radial direction relative to the collar 50 in order to engage with or be disengaged from the final intermediate section 13a. In this embodiment, the locking pin 52 is actuated by means of a mechanical linkage, particularly formed by a lever arm 54, a flange 56 and a cam pathway 58 formed in the flange 56.

The lever arm 54 is pivotably connected to the collar 50 at its bottom end, and engages the locking pin 52 at its top end. For example, the locking pin 52 may comprise a ring 68 through which the lever arm 54 passes to allow the lever arm 54 to cooperate with and actuate the locking pin 52. The flange 56 is rotatable about the longitudinal axis of the base section 11 and the collar 50, and comprises the cam pathway 58. The cam pathway 58 is provided in this embodiment as a profiled slot through which the lever arm 54 passes. When the flange 56 is rotated about the longitudinal axis of the base section 50, the cam pathway 58 is also moved. The cam pathway 58 is shaped such that when the flange 56 is rotated, the lever arm 54 follows the cam pathway 58 and pivots about its lower end. When the flange 56 is rotated in a first, unlocking, direction the cam pathway 58 causes the lever arm 54 to pivot outwards relative to the collar 50 and in doing so the lever arm 54 pulls the locking pin 52 outward relative to the collar 50 to disengage the locking pin from the final intermediate section 13a, allowing the mast to extend or retract. When the flange 56 is rotated in a second, locking, direction, opposite to the first direction, the cam pathway 58 causes pivotal movement of the lever arm 54 inward relative to the collar 50 in order to push the locking pin 52 inward relative to the collar 50 to engage with the final intermediate section 13a, locking the final intermediate section 13a in place relative to the base section 50. For example, the final intermediate section 13a may be locked in a collapsed position or an extended position.

In order to lock or unlock the base section 11 from the final intermediate section 13a the flange 56 may be rotated manually by a user or the flange 56 may be rotated by an actuator or motor, which may in some cases be controlled remotely by a user. As shown in FIG. 6, the flange 56 comprises a handle 62 which may be used to directly rotate the flange 56 in either a locking or an unlocking direction. Any other suitable arrangements may of course be used to rotate the flange 56, such as a mechanical actuator, for example using cords or wires (e.g. with a pulley system), and/or an electrical or pneumatic actuator.

In some embodiments the flange 56 may be have a low friction coating on its inner surface to allow the flange 56 to be easily rotated by a user directly (e.g. by handle 62), by a mechanical actuator (which may be operated by a user, for example including ropes and/or a pulley system), and/or by an electrical or pneumatic actuator. The flange 56 and/or the collar 50 may be provided with a detent or other mechanism in order to fix the flange 56 in either a locked or an unlocked position.

Although only one locking pin 52 and lever arm 54 is shown in FIG. 6, it will be understood that the collar 50 may be provided with any suitable number of locking pin 52, lever arms 54 and cam pathways 58 to allow the base section 11 and the final intermediate section 13a to be locked securely when required. For example, the collar 50 may be provided with two or more, for example three, locking pins 52, lever arms 54 and cam pathways 58 if required. In this way, the flange 56 allows unlocking of each locking pin 52 with a single motion, and the locking pins 52 do not need to be individually operated to extend or collapse the mast.

As shown in FIG. 6, the disengaging block 35 comprises a through-hole 76, which forms part of a retaining mechanism configurable to prevent a locking member (e.g. locking member 21a) moving relative to the disengaging block 35. In particular, a retaining pin may be passed through the through-hole 76 so as to prevent the locking member being removed from the disengaging block 35 and thereby prevent the adjacent section extending. The retaining mechanism may thereby allow a user to ensure that the mast does not extend accidentally, e.g. when the mast is transported.

Figure 7:
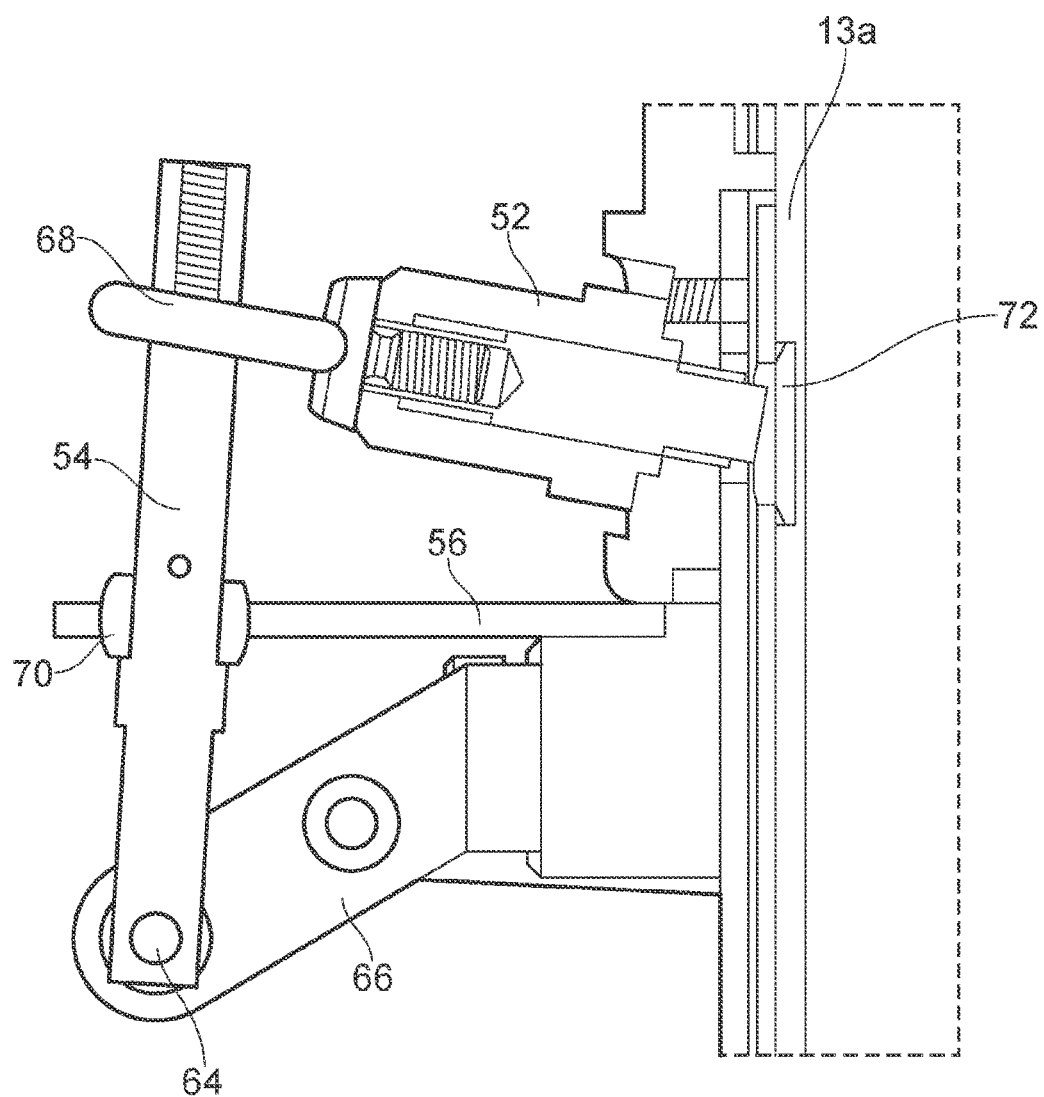
FIG. 7 is a cross-section view showing a mechanical linkage used in the unlocking assembly of FIG. 6.

FIG. 7 is a cross section view showing in more detail the mechanical linkage describe above with respect to FIG. 6, used to operate the locking pin 52 which is linearly movable in a radial direction relative to the collar 50 in order to engage with or be disengaged from the final intermediate section 13a.

As has been described above, the mechanical linkage comprises a lever arm 54, a flange 56 and a cam pathway formed in the flange. The lever arm 54 is pivotable about a mounting point 64 at its lower end, the lever arm 54 being mounted to a support 66 which is connected to the collar 50. The support 66 ensures that the mounting point 64 for the lever arm 54 is spaced away from the collar 50 such that pivoting of the lever arm 54 effects the appropriate linear movement of the locking pin 52 when the flange 56 is rotated. At its upper end, the lever arm 54 engages the locking pin 52 by passing through a ring 68 which is connected to the locking pin 52.

The lever arm 54 is also provided with a follower 70 which is positioned generally centrally along the length of the lever arm 54. The follower 70 is configured to slide within the cam pathway, while allowing the lever arm 54 to pivot to operate the locking pin 52.

The outer surface of the final intermediate section 13a is provided with a retaining portion 72 which is recessed into the outer surface of the final intermediate section 13a. When the base section 11 and the final intermediate section 13a are locked together, the locking pin 52 engages the retaining portion 72. In some examples, the locking pin 52 in a radially inward direction, e.g. by a spring, to ensure that the locking pin 52 automatically engages the pin retaining portion 72. The locking pin 52 may also be threaded such that the locking pin 52 can be directly operated to engage with or disengage from the final intermediate section 13a. For example, the locking pin 52 may be twisted to disengage from the final intermediate section 13a to allow the mast to be raised and lowered without operating the locking mechanism using the rotating flange 56.

Figure 8:
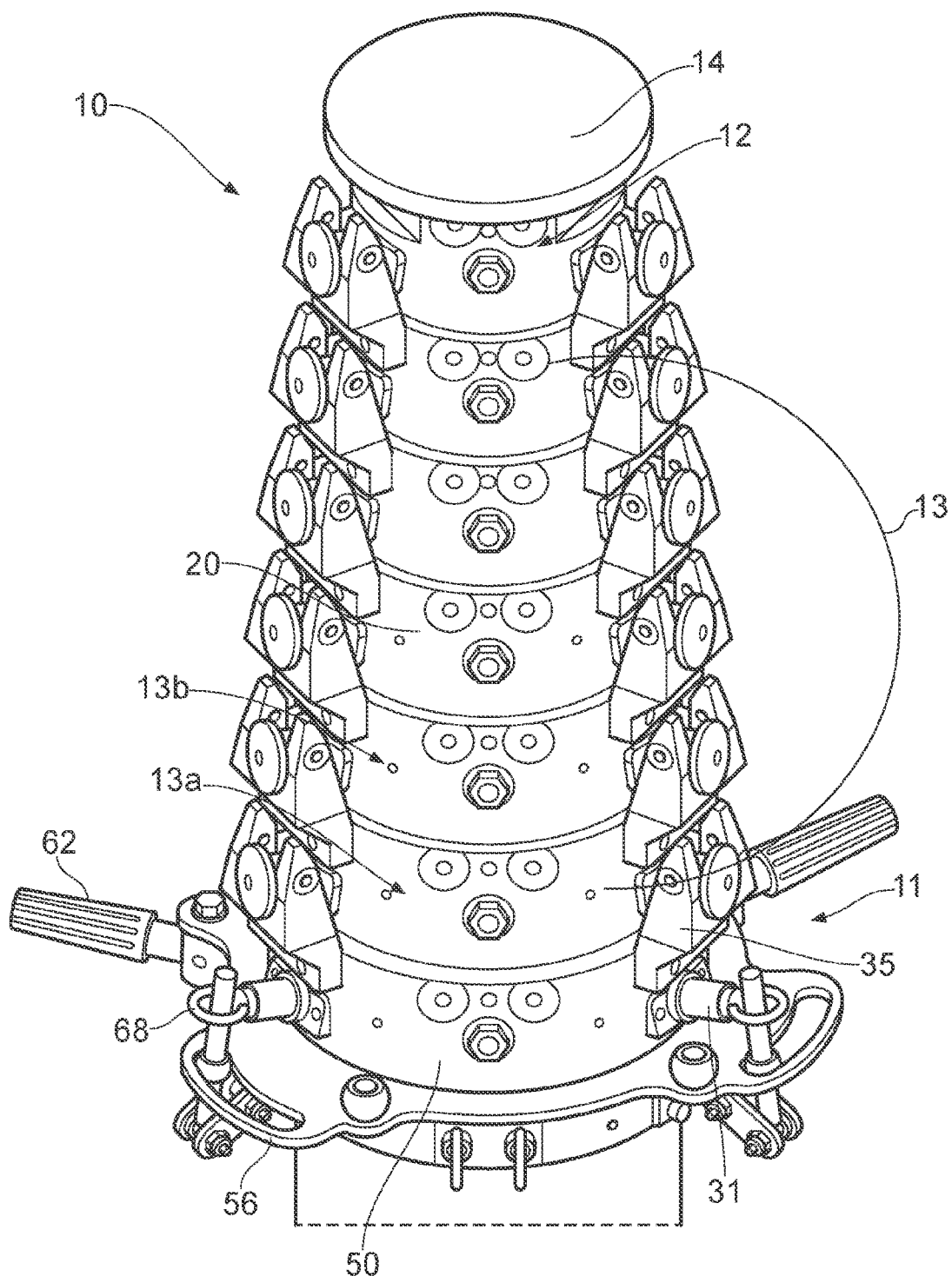
FIG. 8 is a schematic view of a telescopic mast according to an embodiment of the present invention in a collapsed state.

FIG. 8 shows a schematic view of a telescopic mast 10 such as shown in FIG. 2, with a base section locking assembly as shown in FIGS. 6 and 7. Corresponding features are given corresponding reference numerals in accordance with the description given above. FIG. 8 shows two locking pins 31 which can be opened simultaneously by rotation of the flange 56 in a first direction. Rotation of the flange 56 unlocks the locking pins 31 in a manner as described with respect to FIGS. 6 and 7, allowing the mast 10 to be extended from the collapsed configuration shown in FIG. 8. The disengaging blocks and locking members on each of the intermediate sections 13 and the top section 12 then automatically lock the mast 10 into the extended configuration as described above, without requiring a user to manually lock each section into place. The flange 56 may be rotated in a second direction when the mast 10 is fully extended in order to lock the final intermediate section 13a into place. When the mast 10 is collapsed, a user simply rotates the flange 56 in the first direction to unlock the locking pins 31 and allow the intermediate sections and top section 12 to automatically retract, as the disengaging blocks on each section automatically disengage the respective locking members of an adjacent section. In this way, the mast 10 can easily be raised and lowered by operating only the locking pins 31 of the base section 11.

Figure 9:
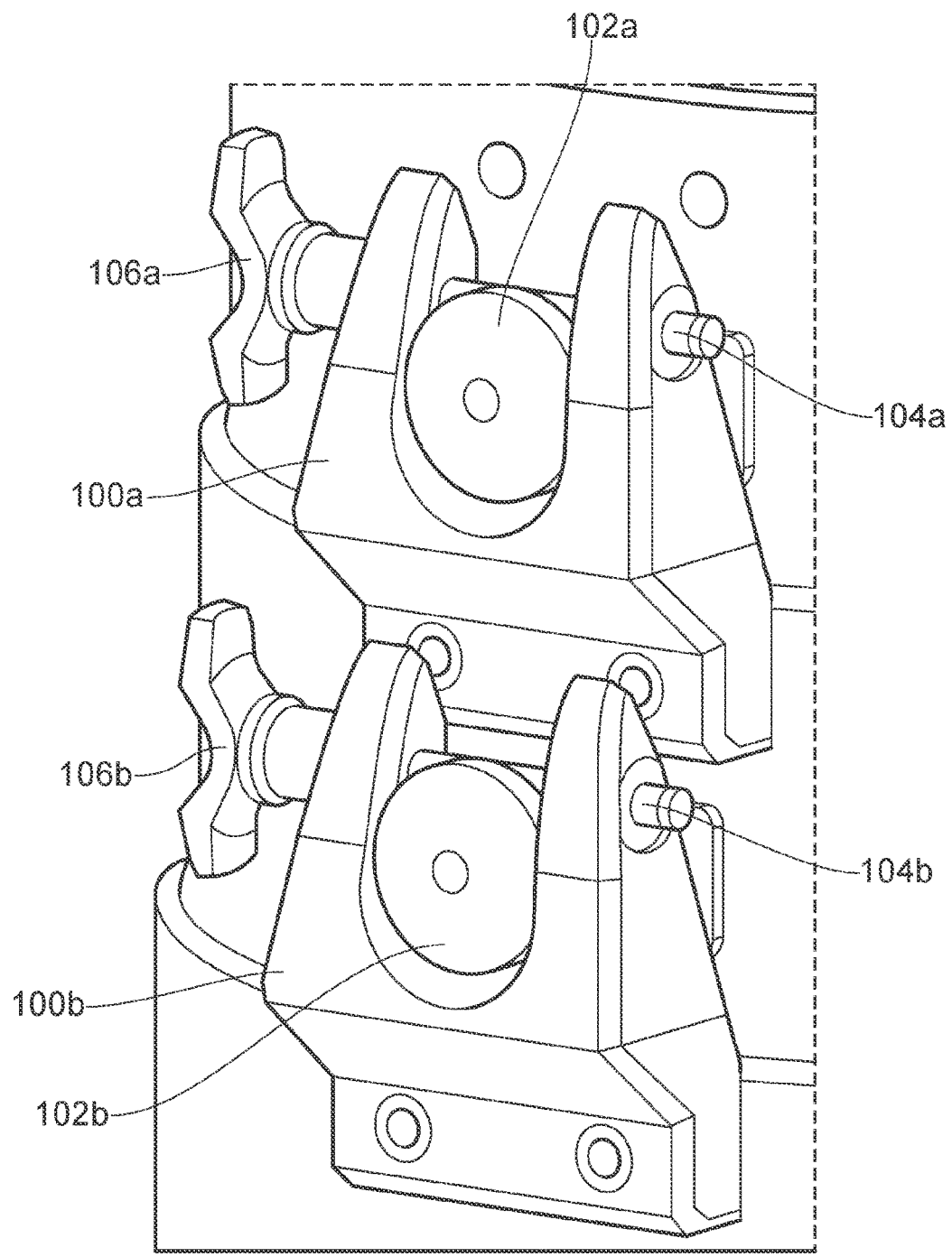
FIG. 9 is a close view of two disengaging blocks for use with embodiments of the present invention.

FIG. 9 is a close view of two disengaging blocks 100a, 100b. As shown, two locking members 102a, 102b are engaged completely with a respective disengaging block 100a, 100b, and so are in an unlocked position in that they do not bear against the sides of adjacent inner sections. Each disengaging block 100a, 100b comprises a retaining mechanism to prevent the respective locking member 102a, 102b moving, and in doing so prevents the sections of the mast from extending. In the example shown, each disengaging block 100a, 100b is provided with a retaining pin 104a, 104b which passes between the arms of the U-shaped disengaging blocks 100a, 100b (particularly by passing through an aperture in one or each arm of the disengaging block, for example through-hole 76 as shown in FIG. 6) so as to prevent the respective locking member 102a, 102b becoming free from the disengaging block 100a, 100b and thereby prevent the adjacent section extending. Each retaining pin 104a, 104b has a handle 106a, 106b to allow a user to easily insert or remove the retaining pin 104a, 104b from the disengaging block 100a, 100b. In this way, the retaining pins 104a, 104b may prevent accidental extension of the mast, for example when the mast is transported. Alternatively, a user may selecting insert retaining pins 104a, 104b into disengaging blocks in order to control which sections of the telescopic mast are able to extend.

All of the features disclosed in this specification (including any accompanying claims, abstract and drawings), and/or all of the steps of any method or process so disclosed, may be combined in any combination, except where at least some of such features and/or steps are mutually exclusive.

Each feature disclosed in this specification (including any accompanying claims, abstract and drawings) may be replaced by alternative features serving the same, equivalent or similar purposes, unless expressly stated otherwise. Thus, unless expressly stated otherwise, each feature disclose is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A telescopic mast comprising:
   a first tubular section;
   a second tubular section having a locking member mounted thereto, wherein the first tubular section is slideably disposed within the second tubular section, and wherein the locking member is moveable in a radial direction relative to the second tubular section to bear against the first tubular section; and a third tubular section having a disengaging block mounted thereto, wherein the second tubular section is slideably disposed within the third tubular section, and wherein the disengaging block is shaped to guide the locking member radially outwards and disengage the locking member from the first tubular section when the mast is collapsed, wherein the third tubular section comprises:
a second locking member which is moveable in a radial direction relative to the third tubular section to bear against the second tubular section;
a flange portion extending from an outer surface thereof, wherein the flange portion is rotatable about a longitudinal axis of the third tubular section, wherein the flange portion is coupled to the second locking member by way of a mechanical linkage, the mechanical linkage being configured to convert rotation of the flange portion into radial motion of the second locking member, such that rotation of the flange portion about the longitudinal axis moves the second locking member in the radial direction relative to the third tubular section, wherein the mechanical linkage further comprises:
a cam pathway formed in the flange portion; and
a lever arm pivotably connected to the third tubular section and engaged with the second locking member, wherein
the cam pathway engages the lever arm such that when the flange portion is rotated the lever arm pivots to move the second locking member in the radial direction.

2. A telescopic mast according to claim 1, wherein the locking member is biased in a radially inward direction so as to automatically bear against the first tubular section when the mast is extended.

3. A telescopic mast according to claim 1, wherein first tubular section has an outwardly directed protrusion and the second tubular section has an inwardly directed protrusion, such that the outwardly direction protrusion and the inwardly directed protrusion abut one another when the mast is fully extended.

4. A telescopic mast according to claim 1, wherein the first tubular section has an axial slot on an outer surface thereof, and wherein the second tubular section comprises a key protrusion on an inner surface thereof and disposed within the axial slot.

5. A telescopic member according to claim 1, wherein the locking member is a locking pin, and wherein the first tubular section comprises a pin retaining portion, wherein the pin retaining portion is a recess in the outer surface of the first tubular section.

6. A telescopic mast according to claim 1, wherein the disengaging block has a bearing surface which is angled such that when the locking member slides over the bearing surface when the locking member engages the disengaging block as the locking member is moved towards the third tubular section, the bearing surface guides the locking member radially outwards relative to the first tubular section to disengage the locking member from the first tubular section.

7. A telescopic mast according to claim 1 wherein the third tubular section is mounted to a base section, wherein the base section comprises:
a connector for connecting the mast to a pressurised fluid supply, and
a valve for selectively releasing pressurised fluid from within the telescopic mast.

8. A locking collar for mounting to a tubular section of a telescopic mast, the locking collar comprising:
a locking member mounted to the collar, the locking member being moveable in a radial direction relative to the locking collar; and
a disengaging block shaped to guide a locking member of a second locking collar radially outwards relative to the second locking collar when the locking member of the second locking collar engages with the disengaging block and moves towards the locking collar;
wherein the locking collar comprises a flange portion extending from an outer surface thereof, wherein the flange portion is rotatable about a longitudinal axis of the locking collar, wherein the flange portion is coupled to the locking member by way of a mechanical linkage, the mechanical linkage being configured to convert rotation of the flange portion into radial motion of the locking member, such that rotation of the flange portion about the longitudinal axis moves the locking member in the radial direction relative to the locking collar, wherein the mechanical linkage further comprises:
a cam pathway formed in the flange portion; and
a lever arm pivotably connected to the locking collar and engaged with the locking member, wherein
the cam pathway engages the lever arm such that when the flange portion is rotated the lever arm pivots to move the locking member in the radial direction.

9. A locking collar according to claim 8, wherein the locking member is biased in a radially inward direction relative to the locking collar.

10. A locking collar according to claim 8, wherein the locking collar comprises an inwardly directed protrusion.

11. A locking collar according to claim 8, wherein the disengaging block has a bearing surface which is angled such that when the locking member of the second locking collar slides over the bearing surface as the second locking collar is moved towards the locking collar, the bearing surface guides the locking member of the second locking collar radially outwards relative to the second locking collar.

12. A locking collar according to claim 8, wherein the disengaging block comprises a retaining mechanism configurable to prevent the locking member of a second locking collar moving relative to the disengaging block.

* * * * *